July 18, 1944. G. A. MOORE 2,353,746
PACKAGING PROCESS
Filed July 13, 1940 2 Sheets-Sheet 1
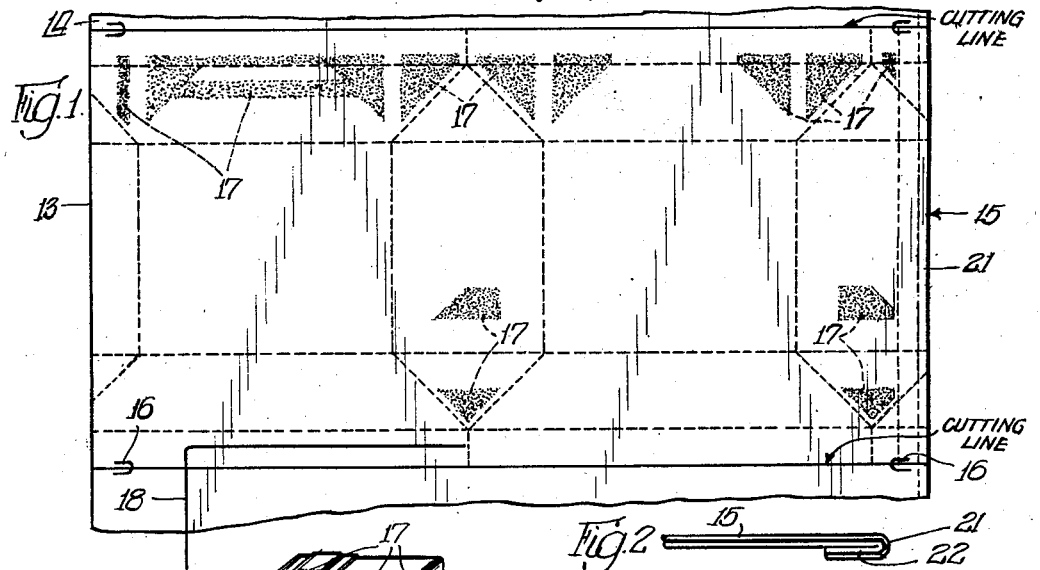
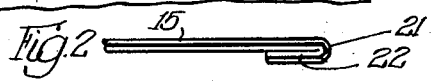
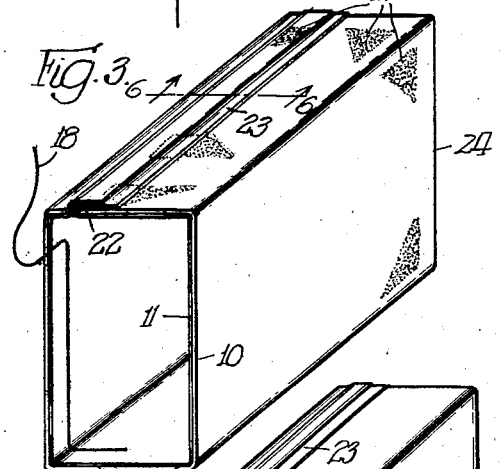
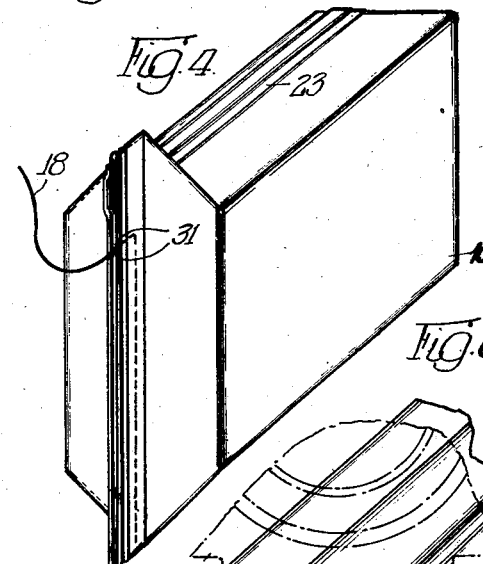
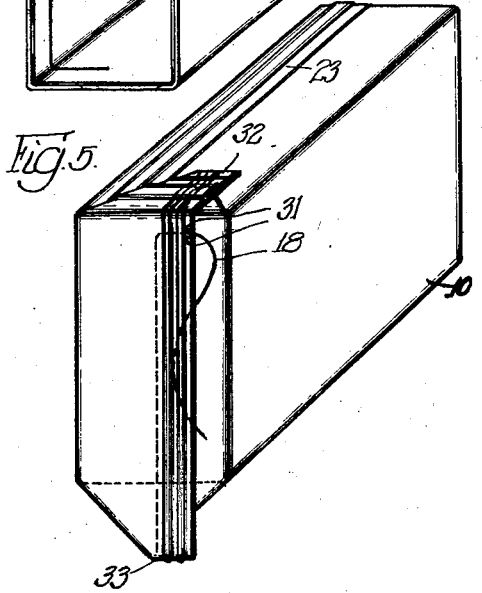
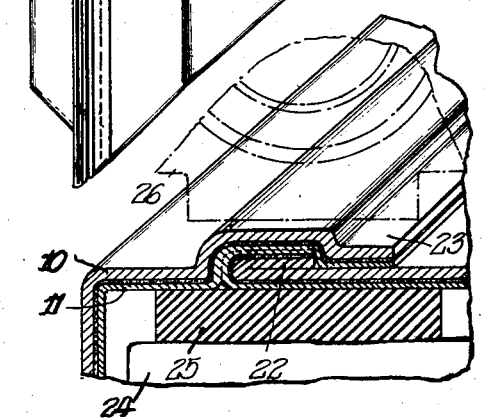
INVENTOR
George Arlington Moore,
BY Cromwell, Greist + Warden
ATTORNEYS.

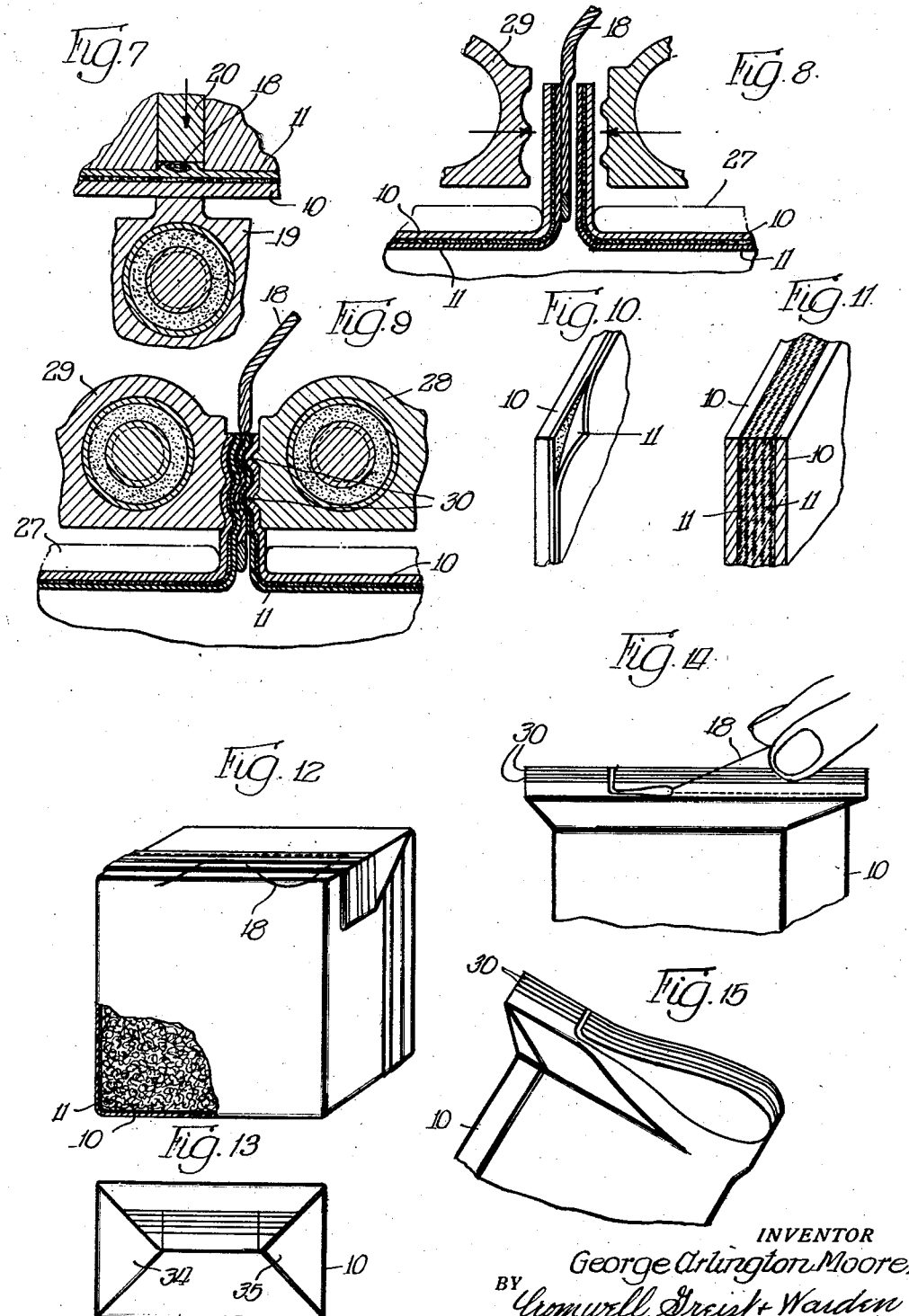

Patented July 18, 1944

2,353,746

UNITED STATES PATENT OFFICE 2,353,746

PACKAGING PROCESS

George Arlington Moore, New York, N. Y., assignor to Shellmar Products Company, Mount Vernon, Ohio, a corporation of Delaware Application July 13, 1940, Serial No. 345,397

7 Claims. (Cl. 99—171)

The present invention relates to the packaging of commodities and has particular reference to an improved type of package and method of forming the same, the invention having as a principal object the packaging of coffee in a flexible container in such a manner that the coffee will retain its flavor for a substantial period of time.

The packaging of coffee in flexible containers has presented many problems, particularly where the container is of the hermetically sealed type necessary for protecting the coffee against the action of the air. If air is allowed to get to the coffee in substantial quantities the coffee quickly becomes rancid or off-tasting. On the other hand, if the flexible container is gasproof there is danger of the container becoming bloated due to the evolution of carbon dioxide from freshly roasted coffee.

A further object of the present invention is the packaging of coffee in an hermetically sealed package of flexible nature in such manner that the coffee retains its flavor and at the same time the package retains its shape.

Still another object of the invention is to provide a container for coffee and the like which includes an outer protective fibrous layer laminated to an inner layer of a substantially gas-impervious and preferably thermoplastic material such as transparent rubber hydrochloride, the blank from which the container is made being folded and heat-sealed in such a manner as to present a continuous interior surface of the thermoplastic transparent rubber hydrochloride, and there being provided a fibrous strand extending from the interior of the container to the exterior of the container in such a manner as to provide for escape of carbon dioxide under pressure but to substantially exclude oxygen from the interior of the container for a period of time sufficient to provide extended freshness of the coffee for marketing purposes.

A still further object of the invention is the provision of a container of the type described composed of an outer protective layer and an inner layer of transparent rubber hydrochloride, the blank from which the container is formed being folded and heat-sealed to provide a continuous interior of the rubber hydrochloride, and there being provided a fibrous strand which has previously been treated with a material such as rubber hydrochloride, the treated strand being thermally welded to the rubber hydrochloride film in such a manner that it passes through a seam portion and an unseamed portion on the interior of the package.

These and additional objects of the invention will be observed upon a consideration of the following description of a preferred embodiment of the invention and by reference to the accompanying drawings, in which Fig. 1 is a view of a laminated blank from which the container is formed and showing thermoplastic adhesive patterns and fold lines for the container;

Fig. 2 is a fragmentary view of the blank shown in Fig. 1 with an end turned over prior to formation of the package;

Fig. 3 is a perspective view showing the blank folded over and with opposite edges heat-sealed into tube formation;

Fig. 4 is a perspective view of the tube shown in Fig. 3 with the end thereof which is to constitute the top closure of the package heat-sealed and with the tearing strand extending from the sealed portion;

Fig. 5 is a view of the container shown in Fig. 4 with the sealed end partially refolded into final closed position;

Fig. 6 is a fragmentary enlarged view showing the heating operation by which opposite edges of the blank are heat-sealed together to form the tube taken along line 6—6 of Fig. 3;

Fig. 7 is a fragmentary sectional view showing the method of attaching the tearing strand or string to the transparent rubber hydrochloride;

Fig. 8 is a fragmentary sectional view showing the method of heat-sealing the top of the package with the tearing string attached thereto;

Fig. 9 shows the final action of the heating member shown in Fig. 8;

Fig. 10 is a fragmentary corner of the blank from which the container is formed with the layer of transparent rubber hydrochloride partially stripped away to expose the thermoplastic adhesive by which it is attached to the paper;

Fig. 11 is a perspective sectional view indicating how the four layers of material are welded together at a seam into a unitary structure;

Fig. 12 is a perspective view of a completed container, partially broken away to show the coffee loaded in the interior thereof;

Fig. 13 is a bottom view of the container shown in Fig. 12;

Fig. 14 is a fragmentary view showing an initial operation in the opening of the container shown in Fig. 12; and Fig. 15 is a view of the package shown in Fig. 14 in finally opened condition.

An initial stage in the production of the container consists in laminating a sheet of paper or the like indicated at 10 to a preformed sheet of transparent rubber hydrochloride such as the product known as "Pliofilm." The operation by which this lamination is effected can vary widely. One satisfactory method consists of passing two webs of the materials through an intaglio unit in which a continuously etched cylinder deposits a plasticized thermoplastic adhesive contained in a suitable solvent upon one face of the web of transparent rubber hydrochloride and the two webs then are joined together under suitable pressure to effect a union between them before the adhesive has dried. In laminating the materials it is preferred that the laminating adhesive be composed of a material such as chlorinated rubber contained in a suitable solvent. Other substances may be used to augment the action of the chlorinated rubber as desired. In some cases a laminating medium composed of a mixture of chlorinated rubber and wax contained in a suitable solvent may be employed.

The resulting composite web indicated at 13 in Fig. 1 then is cut transversely to provide container blanks 15. Before cutting the web into blanks it is preferred to provide the web with notches 16 adjacent each end of the blanks and across the line of cut between blanks. These notches are of advantage in providing for the feed of the web to the cutting unit which precedes the container-forming mechanism.

It also is preferred to print upon the paper side of the composite web prior to cutting the web into blanks a number of spots of thermoplastic adhesive for use in securing end extensions of the finished package adjacent the sides of the package. These spots are indicated in Fig. 1 at 17. Any suitable thermoplastic adhesive by which paper may be welded to itself may be used for this purpose.

To assist in understanding the structure of the container the fold lines by which it is made are indicated on the blank shown in Fig. 1 by broken lines.

After the blank is prepared and severed from the web in the manner described the next operation includes securing to the rubber hydrochloride side of the blank a string or strand as shown at 18. This strand is of a particular construction and has a dual function in the packaging of coffee. One of its functions is to provide for opening the package. The other of its functions is to act as a valve by which carbon dioxide under pressure generated on the interior of the container by the freshly roasted coffee can escape along the string without permitting the ingress of a deleterious quantity of air for a period of time sufficient for allowing the package to be marketed. An ordinary untreated fibrous string generally is much too porous for this purpose and will allow the ingress of enough air to spoil the coffee in a relatively short period of time. In accordance with the present process the string 18 initially is treated with a thermoplastic material compatible with the transparent rubber hydrochloride. Preferably, this treatment includes soaking the string in a solvent and then passing it through a bath of rubber hydrochloride which penetrates the string and reduces its porosity to a minimum. After drying, the string is cut into convenient lengths and attached along the edges of the blank as shown in Fig. 1. The extent and nature of contact of the string with the interior of the package may be seen in Fig. 3. Preferably, it passes along the closure extensions for one side wall and a portion of one end wall. The free end of the string then is attached to the edge of the blank in an outwardly extending direction. The outwardly extending portion of the string is of such dimension as to pass through that portion of the blank which is to be heat-sealed and to extend into the interior of the package so that the attached end will be interiorly of the portion of the package which is sealed together.

The method of attaching the string to the interior of the blank is of importance and may be understood by consideration of Fig. 7. As shown in Fig. 7, the string is positioned on the blank in the manner illustrated in Fig. 1, and a heating element 19 is pressed against the paper side of the blank at a position opposite the position of the string. This pressure is resisted by an unheated element 20 which is pressed against the string itself. Sufficient heat penetrates through the paper to cause the string 18 to become integrally united to the transparent rubber hydrochloride by the thermal union of the rubber hydrochloride on the string and the rubber hydrochloride of the film 11. The string thus becomes firmly attached to the interior of the package without disturbing the film 11.

After attachment of the string in the manner described, one end 21 of the blank is turned over in the manner shown in Fig. 2 so that the rubber hydrochloride becomes the exterior layer on both sides of the turned-over portion. Thereafter the blank is folded into the position shown in Fig. 3 in which the opposite end 23 of the blank overlaps the turned-over portion 22 and extends therebeyond a short distance. When the blank is folded in this position it will be noted that the Pliofilm side of the end 23 is in contact with the Pliofilm side of the turned-over portion 22. The paper then constitutes the exterior layer of the resulting tube. The tube is preferably formed about a mandrel indicated generally at 24 in Fig. 6. The mandrel is provided with a resilient cushion 25 beneath the overlapped ends of the tube and a heating element indicated by the broken lines at 26 is pressed downwardly against the overlapped seam to cause the thermal union of overlapped portions of the transparent rubber hydrochloride. The resilient member 25 yields sufficiently to allow the heating element to thermally seal the extension of the edge 23 to the outer paper layer, as well as sealing the face-to-face portions of the Pliofilm on extension 22 and the under surface of the end 23 of the blank to complete the longitudinal seam of the package.

The formation of a longitudinal seam is followed by pressing together the opposite end extensions on the top of the tube adjacent the string 18 in the manner shown in Fig. 4. This folding operation for bringing together the upper edges of the container may be performed by any suitable mechanism, such as by the folding blades indicated generally by the broken lines at 27 in Fig. 8. These blades simply may rotate over from vertical position to horizontal position. The upper extensions then are heat-sealed together to provide a continuous Pliofilm-to-Pliofilm surface on the interior of the bag adjacent its top. This sealing operation is indicated in Figs. 8 and 9. The heating elements 28 and 29 clamp the upper extension of the container together and provide in the resulting seal the bead portions 30. It will be seen that the sealing members 28 and 29 are positioned above the attached end of the strand 18 but operate upon that portion of the strand which extends in an outwardly direction so as firmly to unite the entire upper end of the container into an integral seam.

After sealing the upper edge of the container through the outwardly extending portion of string 18 the sealed upper extension then is folded over adjacent the top of the bag, the fold being made to the right, as shown in Fig. 5.

Prior to completing the folding-over operation the upper extension of the container on one or preferably both sides of the point at which the string emerges from the container is nicked, as shown at 31.

The end tabs 32 and 33 then are folded over adjacent the side of the container as shown in Fig. 5 and sufficient heat and pressure applied to these tabs in a lateral manner to cause them to adhere to the sides of the container by activation of the registering portions 17 of the thermoplastic adhesive.

The completion of the top closure in the manner described is followed by loading the container with the desired quantity of freshly roasted and preferably ground or comminuted coffee. The loading operation may be performed in any desired manner. After the coffee is loaded in the container the bottom extensions are brought together in the same manner as shown in Fig. 8 and are sealed together by the application of heat and pressure to provide a continuous inner Pliofilm surface. The resulting end extension then is folded over against the end of the package in a direction opposite to the direction of fold used in connection with the top extension. Thereafter the end tabs 34 and 35 of the bottom are folded over against the bottom itself rather than against the sides of the container and heat and pressure are applied to the bottom of the container to activate the thermoplastic material 17 and thereby to cause overlapping paper portions to be sealed together.

To open the container the upper extension is folded into upraised position as shown in Fig. 14 and the string 18 is pulled transversely of the extension. The slits 31 enable the strand to start a cutting action by which the Pliofilm and paper layers both are completely severed to the end of the string. Since the attached end of the string is below the sealed portion of the container this results in the opening of the package in the manner shown in Fig. 15 to provide a pouring spout by which materials contained in the package can be removed. The slits 31 are of importance, since transparent rubber hydrochloride is a tough material which will stretch rather than cut, unless the cut is started as by the nicks adjacent the edge of the film. After the cut is started the string is operative to continue the opening operation. By extending the nicks 31 completely through the upper edge of the end extension it is possible to effect the cutting operation on either side of the package, as desired. If it is desired to cut the package open only along one side, then the nicks may be provided on only one margin of the blank adjacent the string. The cut effected by the string follows its line of attachment to the container blank. That is, the cut initially passes downwardly through the sealed portion of the upped edge and laterally along an unsealed portion to the end of the string. Preferably, the package is opened on the side of the package to which the string is attached since the cutting leverage of the strand is greater on this side than on the opposite side of the package.

The size and the physical nature of the string and the extent of the impregnation of its pores by the preliminary treatment will to a considerable extent determine the period of time for which the container is effective in maintaining coffee fresh. The carbon dioxide normally generated by freshly roasted coffee may find egress from the package along the string. However, the string is sufficiently resistant to the passage of gas as to materially resist the ingress of oxygen along its length. One type of strand which has been used to advantage consists of two-ounce pure flax shoe thread #10. This thread may be prepared for use by passing it through a rubber hydrochloride solvent such as benzol and then into a relatively heavy solution of rubber hydrochloride, followed by thoroughly drying the strand to fix the rubber hydrochloride throughout the interstices of the strand. Since this material is thermoplastic and of a nature compatible with the pellicle 11 of rubber hydrochloride, the subsequent sealing operation by which the upper ends of the bag are closed forms a unitary bond between the exterior layers of paper, the thermoplastic adhesive by which this paper is laminated to the transparent rubber hydrochloride, the film 11, and the string. This constitutes an effective barrier against the egress of gas through the seam, yet provides for the escape of a sufficient amount of $CO_2$ through the string to prevent the package from swelling unduly or becoming mechanically weakened.

It will be noted that in acting as a tearing string the strand 18 actually severs the materials from which the container is composed rather than merely opening up a seam, although before an opening is made in the container it is necessary for the outwardly extending portion of the string to cut through the upper seam.

In a preferred embodiment of the invention a plurality of unit packages produced in the manner described are combined in an outer container of any suitable construction. Then, the unit packages may be opened one at a time so as to retain the remaining sealed units of coffee in the large container in a fresh condition.

The various changes which may be made in the procedure and construction shown herein and described for purposes of explanation coming within the scope of the invention are intended to be included in the appended claims.

I claim:

1. The method of packaging coffee, which comprises loading a quantity of freshly roasted comminuted coffee in a gasproof container having an interior surface of rubber hydrochloride, providing a fibrous strand coated with a thermoplastic material compatible with said rubber hydrochloride, welding said strand to the interior of said container so that a portion of the strand passes transversely through a seam of the container and another portion is secured along the interior surface of the rubber hydrochloride on the inside of the container and below and parallel to the seam, and heat-sealing the container.

2. The method of packaging coffee, which comprises providing a container blank having an inner layer of rubber hydrochloride, treating a fibrous strand with rubber hydrochloride, welding said strand to the interior surface of said layer of rubber hydrochloride, forming said blank into a gasproof container, loading the container with freshly roasted comminuted coffee, and heat-sealing the container to provide a substantially gasproof structure with a seam bonded to an intermediate portion of said strand, said strand extending transversely of said seam and below and parallel thereto.

3. A coffee package, comprising a gasproof container loaded with freshly roasted comminuted coffee, said container being composed of an outer protective layer and an inner layer of rubber hydrochloride autogenously bonded to provide transverse and longitudinal seams, and a rubber hydrochloride treated string welded to the interior surface of said rubber hydrochloride layer for a substantial distance beyond one of said seams and extending through said seam to the exterior of the package, said interior portion of the string lying parallel and below said transverse seam.

4. A container of the type described, comprising a body portion formed into tubular shape from a blank composed of an outer paper layer laminated to an inner rubber hydrochloride layer, the opposite edges of the container being thermally sealed together to provide a longitudinal seam and the end extensions of the container being thermally united to provide transverse end extensions with end seams, and a string covered with rubber hydrochloride extending through one of said end seams and being welded to the interior face of said rubber hydrochloride layer for a substantial distance below said one end seam and parallel thereto, the edge of said container being nicked adjacent the point of emergence of said string from said one end seam.

5. The method of forming a container, which comprises laminating an outer protective layer to an inner preformed film of rubber hydrochloride, treating a fibrous strand with a thermoplastic material compatible with said rubber hydrochloride, thermally uniting said strand to the inner face of said layer of rubber hydrochloride marginally below a portion of the blank intended for a seam and transversely outwardly thereof, forming the resulting blank into container shape and heat-sealing seams of said blank together in such a manner as to provide a continuous inner surface of rubber hydrochloride, one of which seams passes across an intermediate portion of said strand.

6. The method of forming a container, which comprises producing a container blank by laminating a sheet of paper to a preformed film of transparent rubber hydrochloride, folding said blank into face-to-face relation with said film of transparent rubber hydrochloride constituting the inner layer thereof, thermally welding across one edge of said blank and parallel to and below the marginal portion intended for a seam a fibrous string treated with rubber hydrochloride, and heat-sealing adjacent edges of said blank to form seams one of which crosses an intermediate portion of said string, and nicking the edge of the resulting container adjacent the point of emergence of said string from said one seam.

7. In the formation of a container, the steps which comprise forming a blank by laminating a sheet of paper to a preformed sheet of thermoplastic rubber hydrochloride, impregnating a fibrous strand with thermoplastic rubber, placing said strand adjacent said sheet of rubber hydrochloride so that a portion thereof extends interiorly of the edge of said sheet a distance beyond and parallel to a portion intended for a seam and another portion extends outwardly across the edge of said sheet, applying heat and pressure to the paper side of said blank adjacent said strand to weld the latter to said sheet of rubber hydrochloride, folding said blank into container shape with said sheet of rubber hydrochloride constituting the interior thereof, and heat-sealing the edges of the blank to form gastight seams one of which crosses the outwardly extending portion of said strand.

GEORGE ARLINGTON MOORE.